United States Patent [19]
Gilroy et al.

[11] Patent Number: 5,564,317
[45] Date of Patent: Oct. 15, 1996

[54] ONE-PIECE PRESSURE RELIEF VALVE FOR TRANSMISSION COOLING SYSTEM

[75] Inventors: Alan S. Gilroy; Dennis C. Gaida, both of Rochester Hills, Mich.

[73] Assignee: Form Rite, Auburn Hills, Mich.

[21] Appl. No.: 511,744

[22] Filed: Aug. 7, 1995

[51] Int. Cl.$^6$ .......................... F16H 57/04; F04B 49/24
[52] U.S. Cl. ........................ 74/606 A; 137/569
[58] Field of Search .................. 74/606 A, 606 R; 475/161; 137/599.1, 569, 110

[56] References Cited

U.S. PATENT DOCUMENTS

| | | |
|---|---|---|
| 654,484 | 7/1900 | Nygren . |
| 2,877,668 | 3/1959 | Kelbel . |
| 2,926,737 | 3/1960 | Fischer . |
| 3,359,832 | 12/1967 | Schjolin et al. ............... 475/161 X |
| 3,502,166 | 3/1970 | Christenson et al. ............. 475/161 X |
| 3,886,814 | 6/1975 | Bullard et al. . |
| 4,953,582 | 9/1990 | Kennedy ........................ 137/569 X |
| 5,188,142 | 2/1993 | Lind et al. . |
| 5,251,459 | 10/1993 | Grass et al. . |

FOREIGN PATENT DOCUMENTS

| | | |
|---|---|---|
| 330283 | 10/1935 | Italy . |
| 538678 | 8/1941 | United Kingdom . |

*Primary Examiner*—Charles A. Marmor
*Assistant Examiner*—Mary Ann Battista
*Attorney, Agent, or Firm*—Howard & Howard

[57] ABSTRACT

A one-piece relief valve is incorporated into a transmission cooling system. The one-piece relief valve replaces the prior art systems which have used plural T-connections to achieve the relief valve function. The one-piece relief valve reduces the number of fluid connections on the transmission cooling system, thus reducing the possibility of leakage.

13 Claims, 1 Drawing Sheet

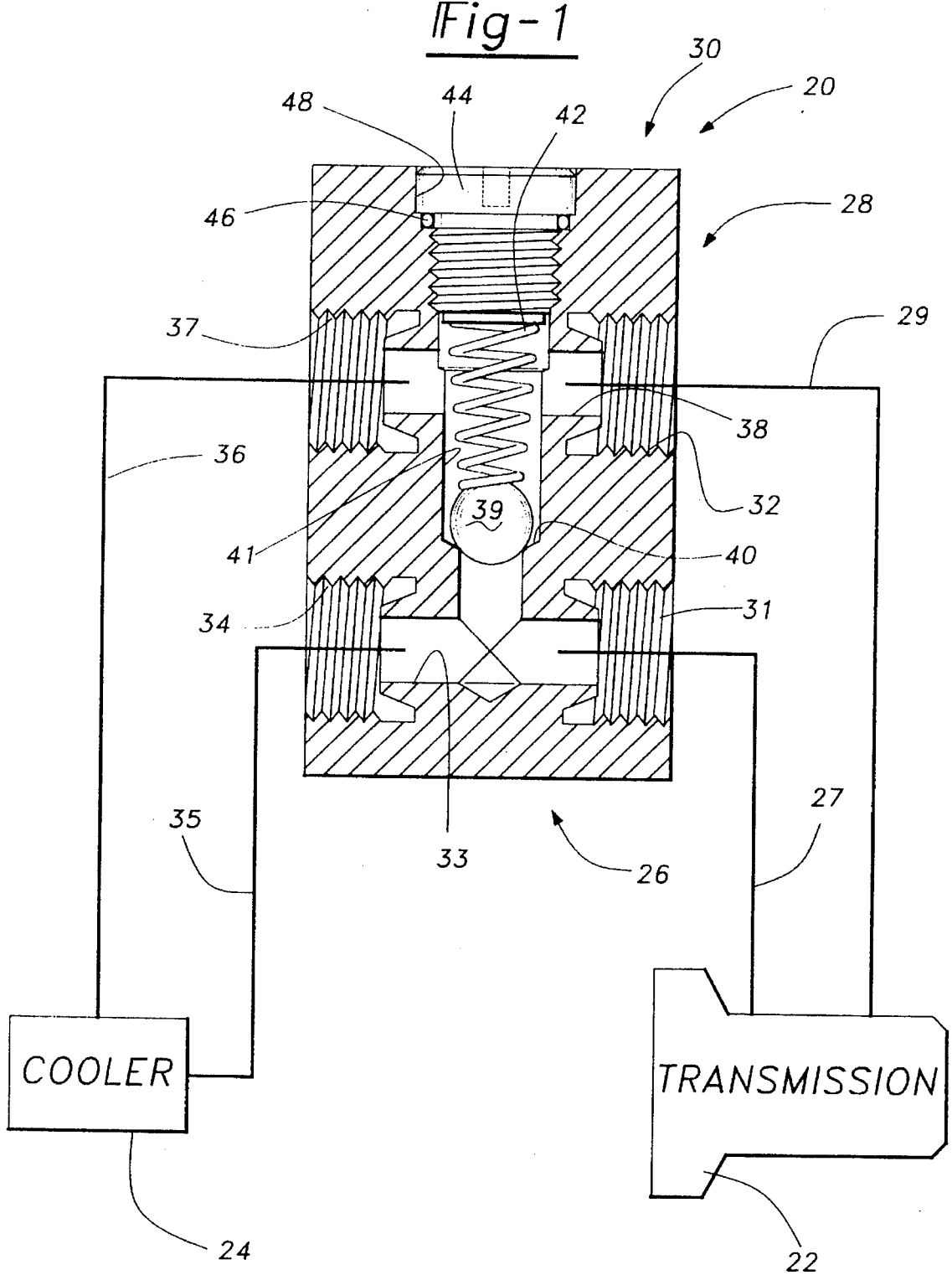

ONE-PIECE PRESSURE RELIEF VALVE FOR TRANSMISSION COOLING SYSTEM

BACKGROUND OF THE INVENTION

This invention relates to a pressure relief valve for the cooling system of a vehicle transmission.

In the prior art vehicles are typically equipped with transmissions that provide different speed ratios between the engine and the drive axles. A transmission typically generates a good deal of heat, and thus oil is circulated to cool the transmission components.

The oil in the transmission becomes quite hot during operation of the vehicle. Thus, the oil is typically routed to a cooling unit. The cooling unit cools the oil which is then returned to the transmission.

The transmission is spaced some distance from the cooling unit. As such, fluid lines, such as conduits or hoses must travel the distance from the transmission to the cooling unit. The oil travels between the transmission and cooling unit through the fluid lines.

When the vehicle is cool, the oil is relatively viscous and does not move quickly. When the engine is running, oil is continuously being moved to the cooling unit, and from the cooling unit back to the transmission. The oil does not move quickly through the cooling unit. There is often a back pressure on the line leading to the cooling unit. For this reason, some transmission cooling units have incorporated a relief valve for returning a portion of the transmission fluid from the line leading to the cooling unit directly back into the line leading back to the transmission. In the past, these relief valves have included separate components such as a pair of T-connections. The separate components result in an unduly high amount of fluid connections, and also additional parts which require additional assembly time.

The more fluid connections that are created in a transmission cooling system, the more places there are that could potentially leak. A transmission oil leak could be very damaging to the vehicle, and could lead to seizure of the transmission. Thus, the relatively high number of fluid connections is undesirable.

SUMMARY OF THE INVENTION

The disclosed embodiment of this invention includes a one-piece pressure relief valve body incorporated between a transmission and a cooling unit for the transmission. A fluid line leads to the valve body, and the valve body includes a bore connected to another fluid line leading to the cooling unit. From the cooling unit another line leads back to the valve body, and a second bore is connected to a fluid line which leads back to the transmission. The two bores described above extend generally parallel to each other. A pressure relief bore extends perpendicular to the two bores, and connects the two bores. A spring biased relief valve is mounted in the relief bore.

When the fluid pressure in the line leading from the transmission overcomes the spring bias on this ball valve, the oil is allowed to flow through the relief bore directly back to the transmission. Since the one-piece valve body contains all of the fluid connections, there are a smaller number of fluid connections, and also a smaller number of required parts than in the prior art. This reduction in the number of fluid connections and required parts is particularly important in a transmission. It is most undesirable to have the transmission oil leaking.

In other features of this invention, the relief bore is formed in the one-piece valve body by cutting an aperture from an outer end of the body at a side of the body adjacent the return line to the transmission. A plug seals the aperture. Since the plug is adjacent the return line, it is subject to lower pressure fluid than if it were formed adjacent the line leading from the transmission to the cooling unit. The plug is preferably formed with an O-ring to complete the seal.

These and other features of the present invention can be best understood from the following specification and drawings, of which the following is a brief description.

BRIEF DESCRIPTION OF THE DRAWINGS

FIG 1.is a schematic view showing a transmission and cooling unit with a relief valve mounted at an intermediate location.

DETAILED DESCRIPTION OF A PREFERRED EMBODIMENT

A transmission cooling system 20 incorporates a transmission 22 and a cooling unit 24, both shown schematically. A supply fluid line 26 includes fluid line 27 which leads from the transmission toward the cooling unit. A return fluid line 28 includes a fluid line 29 that returns oil from the cooling unit to the transmission. A known circulating system, such as a pump, is utilized to move the transmission fluid through line 26 to the cooling unit, and then to return oil through line 28.

A one-piece relief valve 32 is incorporated into the system 20 between the transmission 22 and the cooling unit 24. A first fluid port 31 receives fluid line 27 and another port 32 receives line 29. A bore 33 connects port 31 to a port 34. Port 34 is connected to a fluid line 35 leading to the cooling unit 24. A fluid line 36 leads from the cooling unit 24 to a port 37. A bore 38 connects port 37 to port 32, and thus back to the fluid line 29. During normal operation, hydraulic fluid moves through supply line 26 from the transmission 22, into line 27, through bore 33, into line 35, and to the cooling unit 24. The fluid is cooled and returned through fluid line 28, including line 36, bore 38, port 32, and line 29.

When the vehicle is cold, the transmission fluid does not move as rapidly as it does when the vehicle is warm. As such, under cold operation a large back pressure may develop in the fluid line 26. That pressure also exists in bore 33.

A relief valve 39 is mounted against a valve seat 40. The relief valve moves within a relief bore 41, and is biased by a spring 42 against seat 40. Should the pressure in bore 33 overcome the force of the spring, the relief valve 39 unseats, and the transmission oil may move directly from line 26 back into line 28. In the inventive relief valve, the bores 33 and 38 extend parallel to each other, and the relief bore 41 and valve seat 40 both extend perpendicular to the bores 33 and 38.

Moreover, the relief bore 40 is preferably formed by drilling a hole in the valve body from an end adjacent to the return line. A plug 44 is mounted to fill the hole. An O-ring 46 seals the plug at the hole 48 which is formed through the end of the one-piece valve body. Since the hole 48 is formed on the return side, the seal 46 will be exposed to lower pressure fluid than if it were formed on the side adjacent to bore 33.

The inventive one-piece relief valve greatly reduces the number of fluid connections for the transmission cooling system, thus correspondingly reducing the number of parts and connections that potentially leak.

A preferred embodiment of the invention has been disclosed, however, a worker of ordinary skill in the art would recognize that certain modifications would come within the scope of this invention. For that reason the following claims should be studied to determine the true scope and content of this invention.

We claim:

1. A transmission fluid cooling system comprising:

a transmission;

a cooling unit;

a supply line leading from said transmission to said cooling unit;

a return fluid line leading from said cooling unit back to said transmission; and a one-piece relief valve body mounted between said transmission and said cooling unit, and receiving an inlet flow from said supply line, and also receiving fluid from said return fluid line such that fluid leaving said transmission passes through a first bore in said valve body and to said cooling unit, and fluid leaving from said cooling unit back to said transmission passes through a second bore in said valve body, and a relief bore connecting said first and second bores in said valve body, said relief bore receiving a relief valve such that if the fluid pressure in said first bore exceeds a predetermined relief pressure on said relief, said relief valve unseats and allows fluid to move from said first bore directly into said second bore.

2. A transmission cooling system as recited in claim 1, wherein said first and second bores are parallel.

3. A transmission cooling system as recited in claim 2, wherein said relief bore is perpendicular to said first and second bores.

4. A transmission cooling system as recited in claim 1, wherein said relief bore is formed from an outer face of said valve body, said relief bore receiving a plug to close said relief bore at an outer end on said outer face, and said plug being adjacent to said second bore.

5. A transmission cooling system as recited in claim 4, wherein an O-ring seal surrounds said plug to seal said relief valve.

6. A transmission cooling system comprising:

a transmission receiving a hydraulic fluid;

a cooling unit for cooling said hydraulic fluid from said transmission;

a hydraulic fluid supply line leading from said transmission to said cooling unit and a hydraulic fluid return line leading from said cooling unit to said transmission; and a one-piece relief valve body disposed between said transmission and said cooling unit, said supply line and said return line both passing through said one-piece valve body, said one-piece valve body having first and second parallel bores, with said first bore forming a portion of said supply line and said second bore forming a portion of said return line, and a relief bore interconnecting said first and second bores, said relief bore being perpendicular to said first and second bores, said relief bore including a spring biased valve, such that if pressure in said first bore exceeds a force on said valves said valve unseats and allows said hydraulic fluid to move from said first bore into said second bore, and thus back into said return line to said transmission.

7. A transmission system as recited in claim 6, wherein said relief bore includes a plug received in a hole cut into an outer face of said one piece valve body to form said relief bore, said outer face being adjacent said second bore.

8. A method for bypassing a cooling system in a transmission fluid system comprising the steps of:

a. forming a supply port in a first rigid body and a return port in a second rigid body;

b. forming a fluid passage between said supply port and said return port in a third rigid body;

c. forming a relief valve between said supply port and said return port, said relief valve opening under sufficient pressure differential between said supply port and said return port;

d. said first, second, and third rigid bodies of steps a. and b. being formed as a one-piece item; and e. then connecting said supply port to a first fluid line connecting a transmission case to a transmission fluid cooler and connecting said return port to a second fluid line connecting said transmission case to said transmission fluid cooler.

9. The method of claim 8 wherein said step (a) further comprises the steps of:

said first, second, and third rigid bodies forming a single valve body; forming a supply bore through said supply port in said single valve body; and forming a return bore through said return port in said single valve body.

10. The method of claim 9 wherein said step (b) further comprises the step of forming a relief bore through said single valve body connecting said supply bore and said return bore.

11. The method of claim 10 further comprising the steps of:

forming said relief valve in said relief bore; opening said relief valve in said relief bore when the pressure difference between said supply bore and said return bore exceeds a predetermined amount, thereby allowing fluid to flow between said supply bore and said return bore.

12. A transmission fluid cooling system comprising:

a transmission; a cooling unit;

a one-piece relief valve unit mounted between said transmission and said cooling unit, said one-piece relief valve unit including a first port in fluid communication with a supply fluid line and a second port in fluid communication with a return fluid line;

said one-piece relief valve unit including a relief valve disposed in a bypass line between said first port and said second port, said relief valve permitting flow through said one-piece relief valve unit from said first port to said second port when the pressure difference between said first port and said second port exceeds a predetermined value; and said first port, said second port, and said bypass line being formed in an integral housing member.

13. The transmission fluid cooling system of claim 12, wherein said integral housing member is a single piece of material.

\* \* \* \* \*